United States Patent [19]

Howard, Jr. et al.

[11] Patent Number: 5,420,191

[45] Date of Patent: May 30, 1995

[54] POLYTETRAFLUOROETHYLENE WITH IMPROVED CREEP RESISTANCE, AND PREPARATION THEREOF

[75] Inventors: Edward G. Howard, Jr., Hockessin; Arthur Z. Moss, Wilmington, both of Del.

[73] Assignee: E. I. Du Pont de Nemours and Company, Wilmington, Del.

[21] Appl. No.: 114,272

[22] Filed: Aug. 30, 1993

Related U.S. Application Data

[63] Continuation-in-part of Ser. No. 917,560, Jul. 21, 1992, abandoned.

[51] Int. Cl.⁶ .................... C08K 5/02; C08L 27/12; C08F 14/18
[52] U.S. Cl. .................... 524/462; 524/463; 524/546; 526/255; 525/199; 525/416
[58] Field of Search .................... 524/462, 463, 546; 526/255, 199, 416

[56] References Cited

U.S. PATENT DOCUMENTS

| | | | |
|---|---|---|---|
| 2,396,629 | 3/1946 | Alfthan et al. | 526/255 |
| 3,541,070 | 11/1970 | Ahrabi | 526/255 |
| 4,110,392 | 8/1978 | Yamazaki | 264/127 |
| 4,360,488 | 11/1982 | Barham et al. | 264/210.1 |
| 4,385,026 | 5/1983 | Barham | 264/288.4 |
| 4,714,748 | 12/1987 | Hoashi et al. | 524/546 |
| 4,824,898 | 4/1989 | Sukigara et al. | 526/255 |

FOREIGN PATENT DOCUMENTS

| | | | |
|---|---|---|---|
| 0005419 | 2/1972 | Japan | 524/546 |
| 0070248 | 6/1976 | Japan | 524/462 |
| 2055874 | 3/1981 | United Kingdom | 524/462 |

OTHER PUBLICATIONS

Thomas et al., *Soc. Plastics Engrs.*, 12:505-525 (1956).
*Chemical Abstracts*, CA 113(22):192949n (Hungarian Appl'n HU 51542 A2, May. 28, 1990).
C. A. Sperati, *High Performance Polymers, Their Origin and Developement*, Seymour and Kirschenbaum, Ed., Elseview Sci. Publishing Inc., pp. 274-275 (1986).
J. Billmeyer, *Textbook of Polymer Sci.*, 99. 419-424.

*Primary Examiner*—Peter A. Szekely

[57] ABSTRACT

Shaped PTFE compositions are disclosed having low creep which are produced by the application of pressure and elevated temperature. Also disclosed is a process for making shaped compositions with low creep by the application of pressure and elevated temperature.

26 Claims, No Drawings

POLYTETRAFLUOROETHYLENE WITH IMPROVED CREEP RESISTANCE, AND PREPARATION THEREOF

This is a continuation-in-part of Ser. No. 07/917,560, filed on Jul. 21, 1992, now abandoned.

BACKGROUND

This invention relates to polytetrafluoroethylene (PTFE) and particularly to shaped compositions of PTFE having substantially improved resistance to cold flow deformation under load (creep) and a novel process for their fabrication.

PTFE is a well-known and highly useful polymeric material typically employed in demanding applications involving exposures to high temperatures and/or highly corrosive environments. However PTFE also exhibits cold-flow or creep to a degree considered excessive in many applications. High creep results in increased cost to the user in the form of maintenance, down-time, and unexpected failure. In typical commercial practicer creep is reduced by incorporating fillers into PTFE by dry mixing prior to forming a shaped article. Fillers may include minerals, graphite, glass and polymeric materials. Because of the wide range of chemically hostile environments in which PTFE is used, it is frequently found that a filled PTFE composition suitable for one particular application is unsuitable for other applications. Thus, specific formulation may be required for each application. Moreover, many fillers increase abrasiveness and reduce wear resistance. A common remedy for high creep in PTFE is to "design around" it, i.e., to devise, sometimes costly, engineering solutions to compensate for the expected creep of the polymer.

Commercially available PTFE is a thermoplastic polymer of unusually high molecular weight which cannot be fabricated using conventional techniques such as melt extrusion or injection molding. Instead, powder processing methods are typically applied to form shaped articles from PTFE. These methods include direct forming of shaped articles by cold compaction of PTFE powder followed by "free sintering", ram extrusion, paste extrusion, and high isostatic pressure processing. Most commonly, billets are formed by cold compaction and free sintering, followed by machining into the final shaped article. In "cold compaction" resin is placed in a mold and formed into a fragile, partially consolidated shaped article by the application of pressure, typically 20–40 MPa, typically at room temperature, but, in any event, at least 50° C. below the melting point of the resin. In "free sintering" the object produced in the "cold compaction" step is removed from the mold and placed unconstrained in an oven where consolidation is completed by the application of temperatures at or above the melting point.

Typical commercial processing of PTFE results in shaped articles which creep about 2.5% as measured by ASTM D-621 method A (Deformation under load). Thomas et al. (Soc. Plastics Engrs., 12, 505 (1956)) report creep as low as 1.5% but the method by which this result is achieved is not made clear in the Thomas et al. text and the result does not appear to be reproducible within that text.

Chemical Abstract CA 113(22):192949n (Hungarian Application HU 51542 A2, published May 28, 1990) describes an apparatus and method for compression molding PTFE wherein 3–10 mm thick PTFE plates fastened to a metal center piece are prepared by rapidly compression molding PTFE powder at 390° C. and 200 kg/cm$^2$ pressure in an apparatus having a spring-supported base.

The inclusion into PTFE of additives other than fillers, such as lubricants, plasticizers and processing aids, is widely practised. The additives are usually solids or high boiling liquids having some compatibility with PTFE at least at elevated temperatures. U.S. Pat. Nos. 4,360,488 and 4,385,026 disclose formation of "non-draining" gels by heating PTFE with a highly fluorinated low molecular weight material at a temperature close to the crystalline melting point of the polymer (330°–350° C.). A solution or swollen mass containing from about 1 to about 50 weight % polymer is formed on heating from which is recovered on cooling a sponge-like gel, said gel retaining no "memory" of the crystallinity of the original PTFE. The gel, after removal of the fluorinated material by extraction in refluxing solvent such as FC-113 (bp 45.8° C.), was described as porous and could be formed into porous shapes, e.g., into porous sheet by pressing between platens. The porous products had increased crystallinity and a partially fibrillar structure. Use as filter membranes or diaphragms for electrochemical cells was disclosed.

U.S. Pat. No. 4,110,392 describes preparation of porous PTFE products wherein PTFE powder or coagulated PTFE dispersion is blended with a liquid lubricant which can include fluorocarbon oils, and the blend is shaped by extrusion and/or rolling into sheet, film or tubing. Shaping is carried out below about 327° C., usually at room temperature. The unsintered shaped article is made porous by stretching in at least one direction, before or, preferably, after, removal of the lubricant. Lubricant-free articles are then sintered at above 327°, commonly about 360° C., and re-stretched below 327° C. to develop fine pores of 100 to 1,000 Å diameter.

SUMMARY OF THE INVENTION

The present invention provides PTFE shaped articles having surprisingly low creep and processes for their production.

One embodiment is a shaped PTFE composition fabricated by mixing virgin PTFE powder with from 0 to about 40% by weight of one or more polyfluorinated substances and simultaneously subjecting said mixture to an applied pressure of at least about 0.7 MPa and a temperature of at least about 327° C., said composition characterized by creep deformation not exceeding about 1%.

A second embodiment is fabricated by mixing virgin PTFE powder with from 0 to 40%, by weight of one or more polyfluorinated substances and simultaneously subjecting said mixture in a mold to a unidirectionally applied pressure of at least about 0.7 MPa and a temperature of at least about 327° C. The shaped compositions of the invention are characterized by creep deformation in the compressive direction not exceeding about 1%. Heat and pressure are typically applied to the PTFE/polyfluorinated substance mixture contained in a mold by hot compression molding (HCM). Preferably, the maximum temperature to which the mixture is subjected is in the range of about 330° C. to 400° C., more preferably about 332° C. to 370° C. When low molecular weight polyfluorinated substances are absent, the preferred HCM temperature range is above the melting point of virgin PTFE, i.e., about 350° C. to 370° C. When a polyfluorinated substance is present, the preferred molding temperature range is about 330° C. to 338° C., more preferably about 332° to 336° C. and the shaped PTFE compositions are further characterized by having two distinct crystalline melting points and a bimodal distribution of extended and folded molecular chains.

By "compressive direction" is meant the direction in which pressure is applied to the PTFE mixture in the mold. Creep deformation in shaped PTFE compositions of the invention measured in the compressive direction is less than 1%.

Preferred polyfluorinated substances for use in this invention include compounds such as TFE oligomers of the formula $A(CF_2CF_2)_n$—R wherein R is a hydrocarbyl radical, A is H or Cl and n is at least, about 10, preferably at least about 20, and perfluorocarbons of the formula $C_xF_{(2x+2)}$ wherein x is at least about 20. Preferably the polyfluorinated substance is present from 0 to about 30% by weight, more preferably from 0 to about 10%. Molding pressures of at least about 1000 psi (6.9 MPa) are required, with pressures of about 3000 to about 6000 psi (21 to 42 MPa) being preferred.

A further embodiment disclosed herein is a shaped PTFE composition fabricated by mixing virgin PTFE powder with from 0 to about 40% by weight of one or more polyfluorinated substances and then cold compacting said mixture at an applied pressure of at least about 0.7 MPa followed by free sintering at about 330° C. to 338° C., further characterized by having two distinct crystalline melting points, a bimodal distribution of extended and folded molecular chains, and a creep deformation of less than 2%

DETAILS OF THE INVENTION

The surprising discovery of the present invention is that shaped articles fabricated by the process of this invention are substantially superior in creep resistance to conventionally fabricated PTFE articles. PTFE articles subjected to maximum temperatures in the temperature range of about 330° to about 338° C. exhibit two distinct PTFE crystalline melting points (at about 342° and 327° C.), characteristic of the presence of both extended chain and folded chain crystalline morphology.

In a preferred embodiment of this invention, virgin resin powder or blend thereof with a polyfluorinated substance, is placed in a mold which in turn is placed between the heated platens of a hydraulic press, and simultaneously heated and compressed. This technique, known as "hot compression molding" (HCM), is in common use for molding thermoplastics other than PTFE homopolymer. However, with the possible exception of the Hungarian reference cited above, applicants are unaware of HCM being used hitherto to fabricate PTFE, and its use in the present invention has provided shaped articles that are surprisingly creep resistant. Conventionally fabricated PTFE is fabricated from PTFE that is characterized by a melting point of about 327° C. and a heat of fusion not exceeding about 30 Joules/gram (J/g). The heat of fusion is determined from a specimen which has been heated at least 20° C. above its melting point and recrystallized from the melt at a cooling rate of 1° C./min from 20° C. above the melting point to about 250° C. or below. Heat of fusion and melting point are determined by differential scanning calorimetry (DSC: ASTM D3418). "Melting point" refers to the temperature at the peak of the DSC melting endotherm.

By "PTFE powder" is meant virgin, as polymerized PTFE which has never been melted and is characterized by a single melting point of about 342° C. and heat of fusion of about 67 J/g.

Commercially available PTFE is believed to be of ultra-high molecular weight, estimated to be at least 10 million. By "low molecular weight polyfluorinated substance" is meant oligomeric PTFE having the formula $A(CF_2CF_2)_n$—R where symbols are defined as above, perfluorocarbons of the formula $C_xF_{(2x+2)}$ wherein x is at least about 20. Suitable polyfluorinated substances are characterized by a molecular weight below about 50,000, a melting point below about 327° C., and a heat of fusion of at least 35 J/g, preferably about 60 J/g, and essentially no volatility at compression molding temperatures of the invention. Heat of fusion is determined by differential scanning calorimetry, as mentioned above.

By "shaped article" is meant any article such as film, sheet, fibers, gears, bushings, wheels, nozzles, rods, bars and the like, formed by thermal consolidation of the virgin resin powder in batch, semi-continuous or continuous operation. A shaped article of this invention may also be an article cut or machined from an intermediate form which is itself a shaped article of the invention, such as a gasket cut from sheet.

By "creep" is meant Deformation Under Load (ASTM D-621 Method A), measured between 21° and 24° C. at a pressure of 1000 psi (6.9 MPa). Pressure is applied hydraulically, the ram force having been calibrated using a precision force gauge. Hydraulic pressure is monitored electronically using an Omega Engineering PX303-050G10V pressure transducer with a precision of ±0.05 psi, and did not vary more than 0.1 psi during the course of a 24-hour test. Physical displacement of the sample is measured using an Ono Sokki model EG225 linear gauge with a precision of ±0.00001".

The highest temperature at which PTFE powder is consolidated to a shaped article according to this invention is in the range of about 330° C. to 400° C., preferably 332° C. to 370° C. The precise temperature employed within the above ranges depends on the properties desired, as described below. At temperatures below about 330° C., consolidation is insufficient to form a useful article. At temperatures above about 400° C., decomposition of PTFE becomes significant.

There is no defined minimum pressure which must be applied during the application of temperature to the compression molded powder to produce the shaped articles of this invention, However, pressures in the range of 7-70 MPa are preferred, with pressures in the range of 20-40 MPa being most preferred.

It has been discovered that an improvement in creep resistance of about 60% is achieved by HCM performed above the virgin PTFE melting point, i.e. above about 342° C., as compared to the creep resistance of the same grade of PTFE using a conventional sintering process.

It has been further discovered that mixing the low molecular weight polyfluorinated substance with PTFE resin prior to filling the mold produces a further substantial reduction in creep: up to about 30% further reduction when the molding temperature is above the virgin PTFE melting point, and up to about 60% further reduction when said polyfluorinated substance-containing compositions are consolidated at temperatures above about 330° but below the melting point of the virgin PTFE. The polyfluorinated substance may be present from 0 to 40%, preferably in the range of 0 to 30%, most preferably in the range of 0 to 10%. At polyfluorinated substances levels at the high end of the range, samples may become fragile.

PTFE powder and the polyfluorinated substance or mixture of substances may be blended together at room temperature and then charged to the mold for HCM. Preferably, the HCM temperature for preparing shaped articles from such blends is in the range of about 330° to 338° C.

The 60% reduction in creep shown by PTFE articles fabricated by the process of this invention when the temperature is above the melting point is achieved with little or no trade-off in other desirable properties of PTFE associated with sintered parts, such as tensile toughness. Toughness in articles fabricated from mixtures of PTFE and polyfluorinated substances is somewhat lower than that of conventionally sintered PTFE parts, especially when the consolidation temperature of the former is below the melting point of virgin PTFE. However, impact toughness is observed to increase when low molecular weight polyfluorinated substances are absent or present in only small amounts and HCM is performed below the melting point of virgin PTFE.

When PTFE with or without polyfluorinated additive is consolidated above the melting point by the cold compaction, free sintering cycles which employ a similar temperature/time history to that in the HCM cycles of the present invention process, the improvements in creep realized herein are not obtained. When PTFE with or without polyfluorinated additive is consolidated below the melting point by the cold compaction, free sintering cycles some improvement in creep may be realized but less than when elevated pressure and elevated temperature are simultaneously applied.

In typical practice of this invention, the powder is placed in an unheated mold, and smoothed to a uniform depth. The male part of the mold is placed on the powder and the mold placed between the pre-heated platens of the hydraulic press. To achieve adequate thermal and mechanical equilibration of the resin powder, and to minimize stresses in the consolidated part, pressure and temperature are then raised gradually, step-wise, to the final selected values for consolidation. The mold is then cooled slowly, preferably at a rate of about 0.5°–1.5° C./min, to about 250° C., below which temperature it may be rapidly quenched.

The following is a typical hot compression molding procedure to prepare a flat plaque according to the process of this invention.

1. Preheat the platens to 230° C.
2. Fill mold with resin powder and smooth to uniform depth.
3. Place mold between platens and raise pressure to about 50 psi or "contact" pressure—usually the lowest pressure indication on the press.
4. Hold 1 hour.
5. Still maintaining "contact" pressure, increase set points on heat controllers to 20°–40° C. below final consolidation temperature.
6. Hold 1 hour.
7. Still maintaining "contact" pressure, increase set points to final consolidation temperature.
8. Hold 30 minutes.
9. Increase pressure to final consolidation pressure.
10. Hold 30 minutes.
11. Leaving pressure on, reduce mold temperature by 1° C./minute to ca. 250° C.
12. Cool rapidly to room temperature.

In the following examples of the invention, and in the comparative examples, temperatures are in degrees Celsius and percentages are by weight unless otherwise indicated. The PTFE resin employed was Du Pont Teflon ® Type 7A granular resin which has a virgin resin melting point of 342° C. and a virgin polymer heat of fusion of about 67 Joules/gram. Also, unless otherwise noted, low molecular weight polyfluorinated additive was the oligomeric PTFE Du Pont Vydax ® 1000 having a molecular weight of 26,000, a melting point of 322° C. and a heat of fusion of about 60 Joules/gram. Vydax ® 1000 is supplied commercially as a 7% solids dispersion; before being used as described below, the slurry was dried at 70° C. to yield a dry oligomer powder. All plaques were square, 3.5" edge length, and about ⅛" thick.

Specimens for creep testing were prepared by cutting ½" squares from ⅛" thick plaques. Four squares were stacked to provide a ½"-"cube" specimen.

Impact strength was determined by ASTM D256-90 (Notched Izod). Tensile properties were determined by ASTM D638-89. It is expected that compression molding conditions within the specified temperature range but with combinations of pressure and dwell times other than those employed in the following examples will also be found to provide shaped articles of the invention. Such alternative combinations will be readily within the purview of those skilled in the art.

EXAMPLE 1

Virgin PTFE containing no polyfluorinated additive was formed into plaques by HCM. The mold was held for 1 h at each of 230° C., 330° C., and 370° C. at contact pressure, followed by 30 minutes at 370° C. at 3.3 kpsi pressure. It was then quenched at 0.9° C./min to 250° C. Samples were cut from the plaques for determination of creep, impact resistance, and tensile properties. Results are shown in Table 1.

TABLE 1

| | Properties of PTFE Hot Compression Molded at 370° C. | | | | |
|---|---|---|---|---|---|
| Deformation Under Load (%) | Izod Impact (ft-lbs/in) | Initial Modulus (kpsi) | Stress to Yield (kpsi) | Elongation to Break (%) | Tensile Toughness (kpsi) |
| 0.98 | 3.1 | 110 | 1.9 | 349 | 11.2 |

Comparative Example 1

Virgin PTFE containing no polyfluorinated additive was formed into plaques by cold compaction at a pressure of 4.9 kpsi, removed from the mold and sintered in a Blue M model AGC-190F-MP1 inert gas oven. The plaques were heated at 1° C./min to 228° C., held 1 h, then heated at 2° C./min to 327°–329° C. held 30 minutes, then heated at ca. 2° C./min to 367° C., held 90 min, then quenched at 0.5°–1° C./min to 110° C. This process corresponded closely to that recommended in the commercial literature for articles of comparable size and shape.

Samples were cut from the plaques for determination of creep, impact resistance, and tensile properties. Results are shown in Table 2.

TABLE 2

Properties of Cold-Compacted PTFE Free Sintered at 370° C.

| Deformation Under Load (%) | Izod Impact (ft-lbs/in) | Initial Modulus (kpsi) | Stress to Yield (kpsi) | Elongation to Break (%) | Tensile Toughness (kpsi) |
| --- | --- | --- | --- | --- | --- |
| 2.35 | 3.0 | 60 | 1.5 | 480 | 13.8 |

EXAMPLE 2

Virgin PTFE containing no polyfluorinated additive was formed into plaques by the process of Example 1 except that the 1 hour hold at 330° C. was eliminated, and the final consolidation temperature was 334° C. Samples were cut from the plaques for determination of creep, impact resistance, and tensile properties. Results are shown in Table 3.

TABLE 3

Properties of PTFE Hot Compression Molded at 334° C.

| Deformation Under Load (%) | Izod Impact (ft-lbs/in) | Initial Modulus (kpsi) | Stress to Yield (kpsi) | Elongation to Break (%) | Tensile Toughness (kpsi) |
| --- | --- | --- | --- | --- | --- |
| 0.9 | 6.3 | 134 | 1.84 | 9.2 | 0.56 |

Creep was slightly lower than in Example 1. Tensile strength and toughness were much reduced, but impact resistance was surprisingly much higher.

Comparative Example 2

Virgin PTFE containing no polyfluorinated additive was formed into plaques by cold compaction and free sintering by the process of Comparative Example 1 except that the hold time at 228° C. was 105 minutes, the second hold time was at 322° C. and the final consolidation temperatures were as shown in Table 4. Samples were cut from the plaques for determination of creep and impact resistance. Results are shown in Table 4.

TABLE 4

Properties of Cold-Compacted PTFE Free Sintered Below the Melting Point

| Sample # | Sintering Temp (°C.) | Deformation Under Load (%) | Izod Impact (ft-lbs/in) |
| --- | --- | --- | --- |
| 1 | 332 | 1.63 | 0.3 |
| 2 | 334 | 3.01 | 0.3 |
| 3 | 337 | 2.70 | 0.3 |
| 4 | 340 | 1.80 | 0.3 |

The creep was clearly higher than in Example 2, while the impact strength was much lower.

EXAMPLE 3

Vydax® 1000 was dry mixed by tumbling with PTFE to form a mixture containing 5% by weight of Vydax®. Plaques were formed by the process of Example 1 and samples cut for determination of creep, impact strength and tensile properties. Results are in Table 5.

TABLE 5

Properties of PTFE containing 5% Vydax ® Hot Compression Molded at 370° C.

| Deformation Under Load (%) | Izod Impact (ft-lbs/in) | Initial Modulus (kpsi) | Stress to Yield (kpsi) | Elongation to Break (%) | Tensile Toughness (kpsi) |
| --- | --- | --- | --- | --- | --- |
| 0.72 | 2.7 | 173 | 2.0 | 211 | 6.0 |

The creep was lower than that in both Examples 1 and 2, while the tensile toughness was far better than in Example 2. Impact strength and tensile toughness were somewhat lower than those in Example 1.

Comparative Example 3

A plaque was fabricated by the process of Comparative Example 1 using the resin composition of Example 3. Creep and impact strength were determined. Results are shown in Table 6.

TABLE 6

Properties of Cold-Compacted PTFE containing 5% Vydax ® Free Sintered at 370° C.

| Deformation Under Load (%) | Izod Impact (ft-lbs/in) |
| --- | --- |
| 2.3 | 3.1 |

EXAMPLE 4

The resin composition of Example 3 was formed into plaques by the process of Example 2. Results are shown in Table 7.

TABLE 7

Properties of PTFE containing 5% Vydax ® Hot Compression Molded at 334° C.

| Deformation Under Load (%) | Izod Impact (ft-lbs/in) | Initial Modulus (kpsi) | Stress to Yield (kpsi) | Elongation to Break (%) | Tensile Toughness (kpsi) |
| --- | --- | --- | --- | --- | --- |
| 0.87 | 8.3 | 130 | 2.1 | 169 | 2.81 |

Creep was slightly higher than in Example 3, and impact toughness much higher. An additional plaque fabricated under the same conditions was found to exhibit highly variable impact toughness; the reasons for that high variability are not known.

EXAMPLE 5

Vydax® 1000 was dry mixed by tumbling with PTFE to form a mixture containing 20% by weight of Vydax® Plaques were fabricated by the process of Example 1 and samples cut for determination of creep, impact strength and tensile properties. Results are in Table 8.

TABLE 8

Properties of PTFE containing 20% Vydax ® Hot Compression Molded at 370° C.

| Deformation Under Load (%) | Izod Impact (ft-lbs/in) | Initial Modulus (kpsi) | Stress to Yield (kpsi) | Elongation to Break (%) | Tensile Toughness (kpsi) |
| --- | --- | --- | --- | --- | --- |
| 0.63 | 2.6 | 135 | 1.1 | 42 | 0.4 |

Creep was lower than that in Example 1 to about 35%.

Comparative Example 4

The composition of Example 5 was formed into plaques by the process of Comparative Example 1 except that the quench rate was 2° C./min. Results are shown in Table 9.

TABLE 9

Properties of PTFE containing 20% Vydax ® Sintered at 370° C.

| Deformation Under Load (%) | Izod Impact (ft-lbs/in) | Initial Modulus (kpsi) | Stress to Yield (kpsi) | Elongation to Break (%) | Tensile Toughness (kpsi) |
| --- | --- | --- | --- | --- | --- |
| 2.8 | 2.6 | 131 | 1.0 | 58 | 0.5 |

As compared to Example 5, creep was much higher while the remaining properties were essentially unchanged.

EXAMPLE 6

The composition of Example 5 was formed into plaques by the process of Example 2 except that the final consolidation temperatures were as shown in Table 10. Samples were cut for determination of creep, impact strength and tensile properties. Results are in Table 10.

TABLE 10

Properties of PTFE containing 20% Vydax ® Hot Compression Molded Below the Melting Point

| Molding Temperature (°C.) | Deformation Under Load (%) | Izod Impact (ft-lbs/in) | Initial Modulus (kpsi) | Stress to Yield (kpsi) | Elongation to Break (%) | Tensile Toughness (kpsi) |
| --- | --- | --- | --- | --- | --- | --- |
| 330.5 | 0.42 | 0.7 | NA | NA | NA | NA |
| 332 | 0.42 | 1.5 | BROKE | BROKE | BROKE | BROKE |
| 334 | 0.45 | 0.5 | 90 | 0.8 | 7.9 | 46 |

Creep was very low in these samples, but they were fragile. Four out of five tensile specimens from the plaque fabricated at 332° C. broke at the first application of load; one of five broke from that fabricated at 334° C.

Comparative Example 5

The composition of Example 5 was formed into plaques by the process of Comparative Example 2 except that the final consolidation temperatures were as shown in Table 11. Results are in Table 11.

TABLE 11

Properties of PTFE containing 20% Vydax ® Sintered Below the Melting Point

| Sintering Temperature (°C.) | Deformation Under Load (%) | Izod Impact (ft-lbs/in) | Initial Modulus (kpsi) | Stress to Yield (kpsi) | Elongation to Break (%) | Tensile Toughness (kpsi) |
| --- | --- | --- | --- | --- | --- | --- |
| 328 | 1.6 | 1.4 | NA | NA | NA | NA |
| 332 | 1.6 | 0.3 | NA | NA | NA | NA |
| 335 | 1.5 | 0.3 | 123 | 0.4 | 9 | 11 |
| 338 | 1.5 | 0.4 | NA | NA | NA | NA |

The samples were very fragile, and no significant benefit in creep was realized.

EXAMPLE 7

Vydax® 1000 was dry mixed with PTFE by tumbling to form a mixture containing 25% by weight of Vydax® 1000. A plaque was formed by the process of Example 2 with the final consolidation temperature of 332° C. and parts cut out for creep and impact resistance determinations. Results are in Table 12.

TABLE 12

Properties of PTFE containing 25% Vydax ® Hot Compression Molded at 332° C.

| Deformation Under Load (%) | Izod Impact (ft-lbs/in) |
| --- | --- |
| 0.37 | 0.6 |

EXAMPLE 8

Specimens prepared by various techniques shown in Table 13 were heated in an inert atmosphere oven according to the following cycle:
1. Ramp from 40 degrees to 250 degrees in 1 hour
2. Hold @ 250 deg. for 0.5 hr.
3. Ramp from 250 degrees to 330 degrees in 0.5 hr.
4. Hold @ 330 deg. for 1.0 hr.
5. Ramp from 330 degrees to 360 degrees in 1.0 hr.
6. Hold @ 360 deg. for 1.0 hr.
7. Cool from 360 degrees to 250 degrees in 2.0 hrs.
8. Heat off.

Results are tabulated below:

TABLE 13

| Plaque | Fabrication Method of Fabricated | % Creep | Thickness Change After Reheating Cycle (%) |
| --- | --- | --- | --- |
| a) | Hot Compression | 0.82 | +19% |

TABLE 13-continued

| Fabricated Plaque | Method of Fabrication | % Creep | Thickness Change After Reheating Cycle (%) |
|---|---|---|---|
| | Molded at 370° C. | | |
| b) | Hot Compression Molded 334° C. | 0.90 | +12% |
| c) | Cold compacted Free Sintered at 367° C. | 2.55 | 0% |
| " | Cold compacted Free Sintered at 367° C. | " | 0% |
| d) | Cold compacted Free Sintered at 332° C. | 1.63 | +8% |

What is believed to happen is that the PTFE powder is compacted under pressure to a certain thickness. When free sintering is performed above the melting point, the thickness increases to some equilibrium value. If free sintering is performed below the melting point, the presence of extended chain crystals may retard the movement of the chains into that equilibrium position. If thermal consolidation occurs while the specimen is held under pressure, the thickness increase observed in free sintering is virtually completely prevented, and the compacted state is frozen in. This creates a frozen in stress in the direction of expansion which then acts against the applied stress of the creep test, resulting in a smaller net applied force, and consequently, less creep.

What is claimed is:

1. A shaped PTFE composition fabricated by mixing virgin PTFE powder with from 0 to about 40% by weight of one or more polyfluorinated substances and simultaneously subjecting said mixture to an applied pressure of at least about 0.7 MPa and a temperature of at least about 327° C., said composition characterized by creep deformation not exceeding about 1%.

2. A shaped PTFE composition fabricated by mixing virgin PTFE powder with from 0 to about 40% by weight of one or more polyfluorinated substances and simultaneously subjecting said mixture in a mold to a unidirectionally applied pressure of at least about 0 7 MPa and a temperature of at least about 327° C., said composition characterized by creep deformation in the compressive direction not exceeding about 1%.

3. Composition according to claim 2 wherein the hot compression molding temperature is about 330° C. to about 400° C.

4. Composition according to claim 3 wherein the hot compression molding temperature is about 332° C. to about 370° C.

5. Composition according to claim 4 wherein the hot compression molding temperature is about 350° C. to about 370° C.

6. Composition according to claim 5 wherein said composition has a single melting transition point at about 327° C.

7. Composition according to claim 3 wherein the hot compression molding temperature is about 330° C. to 338° C. further characterized by having two distinct crystalline melting points and a bimodal distribution of extended and folded molecular chains.

8. Composition according to claim 7 wherein the hot compression molding temperature is about 332° C. to 336° C.

9. Composition according to claim 2 wherein the polyfluorinated substance is present in the amount of 0 to about 30% by weight.

10. Composition according to claim 9 wherein the polyfluorinated substance is present in the amount of 0 to about 10% by weight.

11. Composition according to claim 7 wherein a low molecular weight polyfluorinated substance is present.

12. Composition according to claim 2 wherein the low molecular weight polyfluorinated substance is selected from the group consisting of oligomeric PTFE of the formula $A(CF_2CF_2)_nR$ wherein R is hydrocarbyl, A is H or Cl and n is at least about 10, and a perfluorocarbon of the formula $C_xF_{(2x+2)}$ wherein x is at least about 20.

13. Composition according to claim 12 wherein the polyfluorinated substance is oligomeric PTFE and n is at least about 200.

14. A process for preparing a shaped PTFE composition, characterized by creep deformation not exceeding about 1%, said process comprising mixing virgin PTFE powder with from 0 to about 40% by weight of one or more polyfluorinated substances and simultaneously applying to said mixture a pressure of at least about 0.7 MPa and a temperature of at least about 327° C.

15. The process of claim 14 wherein the PTFE powder and from 0 to about 40% of polyfluorinated substances are contained in a mold, pressure is applied unidirectionally and creep deformation in the shaped composition does not exceed about 1% in the compressive direction.

16. Process according to claim 15 wherein the temperature is about 330° to about 400° C.

17. Process according to claim 15 wherein the pressure is at least 7 MPa.

18. Process according to claim 16 wherein the temperature is about 332° to about 370° C.

19. Process according to claim 16 wherein no polyfluorinated substance is present.

20. Process according to claim 19 wherein the temperature is above about 350° C.

21. Process according to claim 16 wherein a polyfluorinated substance is present.

22. Process according to claim 21 wherein the temperature is above about 350° C.

23. Process according to claim 16 wherein a polyfluorinated substance is present and the temperature is in the range of about 330° to about 338° C.

24. Process according to claim 21 wherein the temperature is about 332° to about 336° C.

25. Process according to claim 17 wherein the pressure is in the range of about 21–42 MPa.

26. A shaped PTFE composition fabricated by mixing virgin PTFE powder with from 0 to about 40% by weight of one or more polyfluorinated substances and then cold compacting said mixture at an applied pressure of at least about 0.7 MPa followed by free sintering at about 330° C. to 338° C., further characterized by having two distinct crystalline melting points, a bimodal distribution of extended and folded molecular chains, and a creep deformation of less than 2%.

* * * * *